United States Patent [19]

Swaney et al.

[11] Patent Number: 4,506,522
[45] Date of Patent: Mar. 26, 1985

[54] HELICOPTER AIR CONDITIONER COMPRESSOR DRIVING AND MOUNTING APPARATUS

[75] Inventors: Gary Swaney, St. Petersburg; Donald E. Sells, Largo, both of Fla.

[73] Assignee: Aero Engineering Corporation of Clearwater, Clearwater, Fla.

[21] Appl. No.: 562,536

[22] Filed: Dec. 19, 1983

[51] Int. Cl.³ ............................................. B60H 3/04
[52] U.S. Cl. ................................... 62/243; 62/323.4; 123/195 A; 244/60; 417/362; 474/148
[58] Field of Search ............................... 474/148, 150; 123/195 A, 195 R; 417/361, 362; 244/118.5, 60; 62/239, 243, 323.4

[56] References Cited

U.S. PATENT DOCUMENTS

| | | | |
|---|---|---|---|
| 2,381,488 | 8/1945 | Coulson | 474/150 X |
| 3,195,804 | 7/1965 | Ragla | 62/243 X |
| 3,583,658 | 6/1971 | Herweg | 244/1 |
| 3,789,618 | 2/1974 | Feliz | 62/323.4 X |
| 4,021,214 | 5/1977 | Bush | 62/323.4 X |
| 4,138,901 | 2/1979 | Fortin et al. | 474/150 X |
| 4,209,993 | 7/1980 | Rannenberg | 62/80 |
| 4,249,711 | 2/1981 | Godberson | 244/54 |
| 4,445,583 | 5/1984 | Mazur | 417/362 X |
| 4,452,193 | 6/1984 | Morris | 123/195 R |

FOREIGN PATENT DOCUMENTS 1039779 7/1951 France ...................... 123/195 A

Primary Examiner—William E. Tapolcai
Attorney, Agent, or Firm—Bernard, Rothwell & Brown

[57] ABSTRACT

An air conditioner refrigerant compressor driving and mounting apparatus for a helicopter of the type having a free rotating power output shaft, which rotates within a power take-off pad includes a compressor drive assembly drive shaft housing supported by the power take-off pad. A compressor drive assembly drive shaft is connected with the engine power output shaft, extends linearly through the compressor drive assembly housing, and is supported therein by bearing means. A compressor drive assembly drive shaft pulley is attached to the compressor drive assembly drive shaft and rotated thereby. Bracket means are provided for mounting an air conditioner refrigerant compressor on an outer surface of the compressor drive assembly housing such that a compressor drive shaft for driving the compressor is generally parallel with the compressor drive assembly drive shaft. A compressor pulley is attached to the compressor drive shaft and generally aligned with the compressor drive assembly drive shaft pulley. Belt drive means are provided for connecting the compressor drive assembly drive shaft pulley with the compressor pulley to drive the compressor.

12 Claims, 2 Drawing Figures

HELICOPTER AIR CONDITIONER COMPRESSOR DRIVING AND MOUNTING APPARATUS

BACKGROUND OF THE INVENTION

1. Field of the Invention

The present invention relates to an apparatus for mounting and driving a helicopter air conditioner compressor.

2. Description of the Background Art

Helicopters and other single-engine light aircraft are particularly difficult to provide with environmental control systems because of the crowded and cramped spaced within the craft which leaves little space for necessary components of heating and air conditioning systems, and the critical problems of balance associated with such light craft. An example of a system for a piston-driven single-engine airplane is disclosed in U.S. Pat. No. 3,583,658 to Herweg. The Herweg air conditioning system has a condensor and compressor mounted in the fuselage forward of the center of gravity of the aircraft and an evaporator positioned behind the center of gravity so as to balance the craft about its longitudinal, horizontal and vertical axis without changing the center of gravity of the craft and without structural modification of the craft. The compressor is driven by a belt attached to a pulley at the rear end of the piston-engine crankshaft.

The difficulty of incorporating air conditioning components in modern day helicopters driven by turbine engines is particularly compounded. Among the variables encountered in providing components for helicopters and in designing the helicopters themselves are the strength and weight of the structural materials. In providing an auxiliary component for a predesigned helicopter, particular care must be taken so as not to adversely affect the structure or operation of the craft.

In providing an apparatus for mounting and driving an air conditioner refrigerant compressor in a helicopter, there are many obstacles to be overcome. Because of the critical weight/strength factors, it is difficult to find sufficient support for the drive system without adversely affecting such support, e.g., permanently distorting the support structure. The rotation of the compressor and drive system may set up adverse dynamic or vibration characteristics under the vibration environment of the engine drive, main rotor drive, or tail rotor drive. Use of the helicopter engine to drive the compressor may result in an adverse power drain on the engine and potentially dangerous consequences. Similarly, malfunction of the compressor or compressor drive system may damage or incapacitate the engine.

Because of the above-described difficulties and others, few attempts at providing workable refrigerant air conditioning systems for helicopters have been successful. There thus remains a need for a helicopter air conditioner compressor driving and mounting apparatus which does not adversely affect the support structure of the helicopter, introduce adverse vibrational characteristics, result in excessive power drain from the engine, or introduce excessive risk of damage or incapacitation of the engine due to malfunction of the apparatus.

SUMMARY OF THE INVENTION

In accordance with the present invention, an air conditioner compressor driving and mounting apparatus for a helicopter of the type having a free rotating engine power output shaft is disclosed. The compressor drive apparatus is mounted to an engine power take-off pad and is supported by the power take-off pad structure. The compressor drive assembly has a housing and an internal drive shaft with a male spline which fits directly into female splines of the engines power output shaft. The engine power output shaft rotates the compressor drive assembly drive shaft which operates freely inside ball bearings at each end of the compressor drive assembly housing. A compressor drive pulley is mounted to, and rotated by, the compressor drive assembly drive shaft. A compressor is mounted to the compressor drive assembly housing by means of mounting brackets which align the compressor drive pulley and a compressor pulley. The pulleys are connected by means of a drive belt to rotate the compressor.

DESCRIPTION OF THE PREFERRED EMBODIMENT

The present invention is suitable for use in any helicopter having an engine with a power take-off pad such as the Allison Model 250, C-28 and C-30 Engines used in the Hughes 500 and 530 series helicopters. A power output shaft is driven by engine internal gearing as the engine operates.

Figure 1:
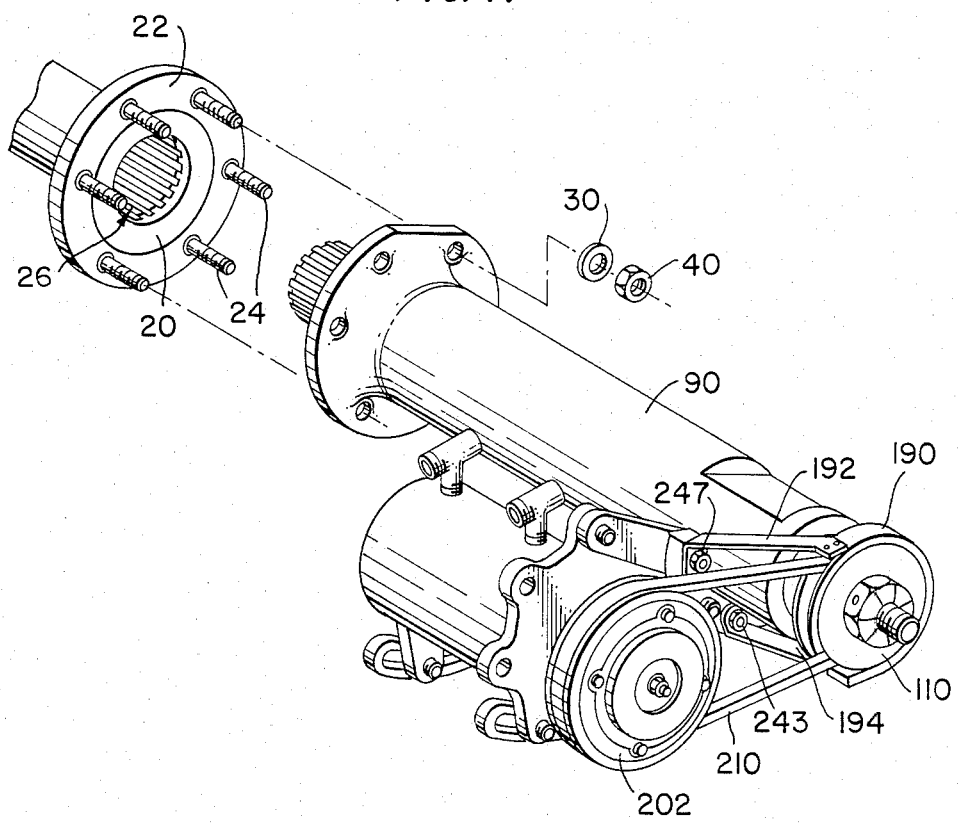
FIG. 1 is a perspective view of a helicopter air conditioner compressor driving and mounting apparatus in accordance with the present invention, and a helicopter engine power take-off pad for connection with and driving of said apparatus.

The particular pad 22, shown in FIG. 1, is the power take-off pad of the Allison Model 250 Turbine Engine. The engine power output shaft 20 rotates within stationary power take-off pad 22 which is supported by an engine support structure (not shown).

Figure 2:
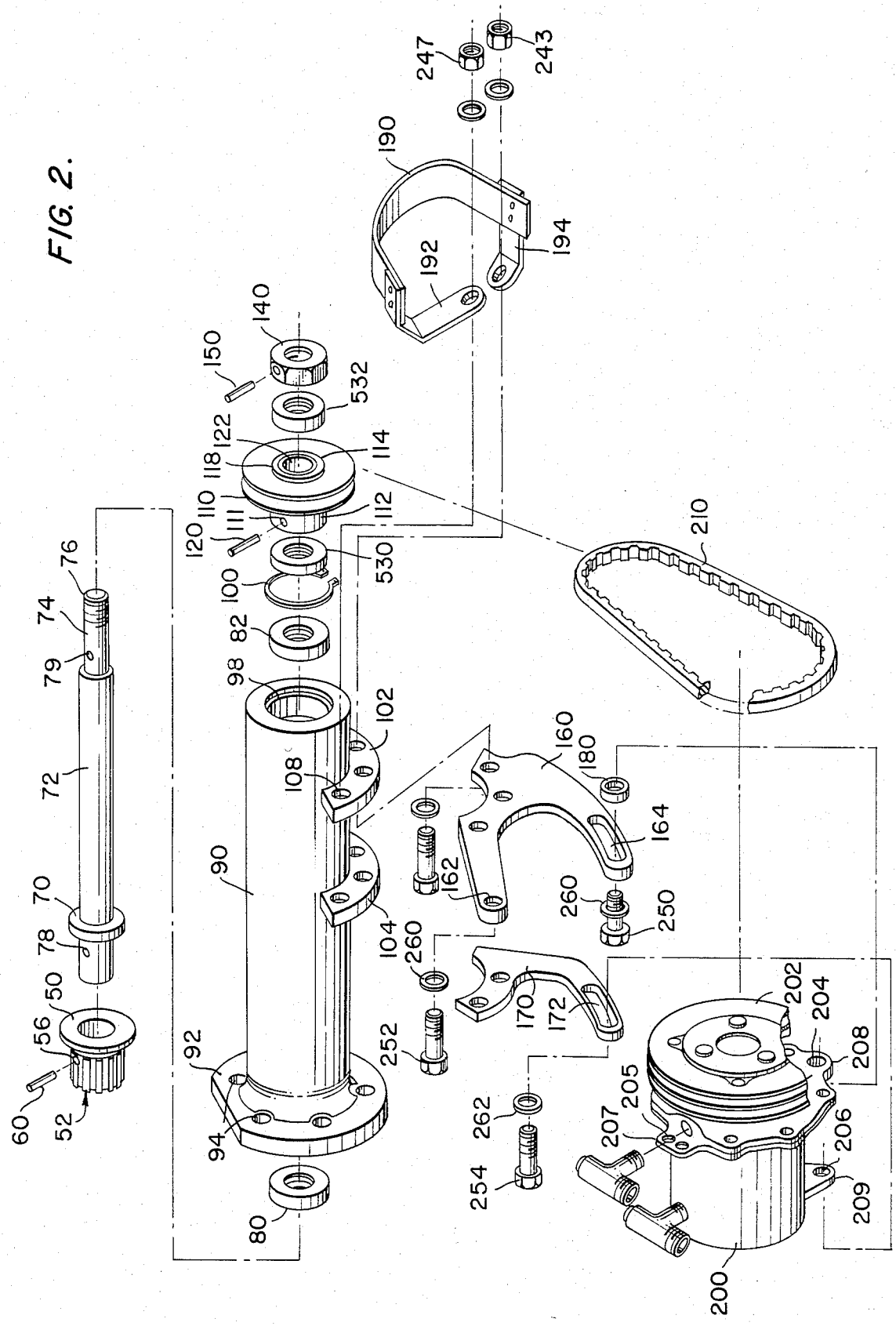
FIG. 2 is an exploded view of the apparatus shown in FIG. 1.

As illustrated in FIG. 2, a compressor drive assembly in accordance with the present invention has a compressor drive assembly drive shaft 72 to which is connected a spline 50 by means of shear pin 60 extending through corresponding openings 56 and 78 in the splined collar 50 and compressor drive assembly drive shaft 72 respectively. Teeth 52 of the spline collar 50 correspond to mating indentations 26 on the internal surface of the power output shaft 20 (see FIG. 1). The shear pin 60 provides means for disconnecting the splined collar 50 from the compressor drive assembly drive shaft 72 should rotation of the compressor drive assembly drive shaft 72 be excessively restricted or stopped.

A compressor drive assembly housing 90 is connected to the engine power take-off pad 22 (see FIG. 1) by any suitable means, such as by a housing flange 92 with openings 94 corresponding to threaded studs 24 extending outwardly from the engine power take-off pad 22. Nuts 40 tightened onto the studs 24 extending through said openings 94 securely fasten the compressor drive assembly housing 90 to the engine power take-off pad 22. The teeth 52 of the splined collar 50 are thereby also held in place in the corresponding mating indentations 26 of the power output shaft 20. Washers 30 may separate the nuts 40 thereby preventing direct contact between the nuts 40 and the housing lip 92.

The compressor drive assembly drive shaft 72 is supported within the compressor drive assembly housing 90 by bearing members 80 and 82 located at opposite ends of the compressor drive assembly housing. The rear bearing 82 is maintained in place within the compressor drive assembly housing 90 by snap ring 100 and a circular ridge 98 on the internal surface of the compressor drive assembly housing 90. The front bearing 80 is similarly maintained in place within the compressor drive assembly housing 90 by shaft retaining ring 70 and a circular ridge (not shown) on the internal surface of the compressor drive assembly housing 90. An end 74 of the compressor drive assembly drive shaft 72 opposite the shaft retaining ring 70 is connected to a transmission drive shaft pulley 110 by means of shear pin 120 extending through corresponding opening 111 in pulley collar 112, and corresponding opening 79 in compressor drive shaft 72. Shear pin 120 permits disengagement of the compressor on the drive shaft pulley 110 from the compressor drive assembly drive shaft 72 in the event that pulley rotation is excessively restricted or stopped.

In particularly preferred embodiments, the compressor drive shaft pulley 110 is provided with bearings 530 and 532 at the front collar 112 and rear collar 114 respectively of the pulley 110. The shaft pulley bearings 530 and 532 permit free and unrestricted rotation of the compressor drive assembly drive shaft 72 within the pulley 110 in the event that shear pin 120 is sheared. Pulley bearing 532 is held in place within opening 122 at the rear collar 114 qf pulley 110 by internal circular ridge 118 and nut 140 which screws onto the threaded end 76 of the compressor drive assembly drive shaft 72 opposite the toothed spline 50. A roll pin 150 maintains nut 140 in place during operation of the drive system. Similarly, pulley bearing 530 is held in place within a corresponding opening (not shown) in front collar 112 of the pulley 110 by an internal circular ridge (not shown) on the internal surface of the pulley 110 within collar 112 and by shaft bearing 82.

On the outer surface of the compressor drive assembly housing 90 is mounted a compressor 200 by means of brackets 160 and 170. The brackets 160 and 170 are connected to mounting attachments 102 and 104 respectively on the outer surface of compressor drive assembly housing 90 by any suitable means, such as by nuts, washers and bolts through corresponding openings as shown. The compressor 200 is attached to the mounting brackets 160 and 170 by any suitable means, such as by bolts 250 and 254 extending through washers 260 and 262, openings 164 and 172 in brackets 160 and 170, into corresponding threaded openings 204 and 206 in compressor housing extensions 208 and 209. Optional spacer 180 extends between bracket 160 and extension 208. Bracket 160 is also attached to compressor 200 by means of bolt 252 extending through washer 260, bracket opening 162 into threaded opening 205 in compressor housing extension 207.

The mounting brackets 160 and 170 are attached to the compressor drive assembly housing 90 so as to bring a compressor shaft, extending linearly within the compressor 200, into generally parallel alignment with the compressor drive assembly drive shaft 72. The compressor 200 is mounted on the drive assembly housing 90 so as to bring a compressor pulley 202 into general alignment with the compressor drive assembly shaft pulley 110. The compressor is preferably a high-efficiency vane rotary refrigerant compressor, such as the Seiko-Seiki Model 807P shown in FIG. 2, but may be any other suitable compressor.

The compressor 200 is driven by an endless belt 210 connecting the compressor pulley 202 with the transmission drive shaft pulley 110. The belt is advantageously constructed of materials which are capable of withstanding the high operating temperatures associated with helicopter engine compartments, e.g., up to about 230° F. The belt is preferably made up of Kevlar ® strands with neoprene sidewalls.

The pulleys 110 and 202 may be of any suitable size, but preferably combine to provide for a compressor speed of about one-half the rotational speed of the power output shaft 20. With the Allison Model 250 engine, the power output shaft rotates at about 6016 RPM at full power.

It is particularly preferred that the compressor drive system deliver about 6 h.p. to the compressor. With the Allison Model 250, this is accomplished by utilizing a pulley system which provides for a compressor speed of about 2979 RPM at full power, e.g., a compressor drive assembly drive shaft pulley of 2.6" in diameter in conjunction with a compressor pulley of 5.25" in diameter. A cooling capacity of about 15,000 BTU/hr. is provided when 6 h.p. is delivered to the Seiko-Seiki Model 807P.

In a particularly preferred embodiment, the tension of belt 210 is made adjustable by utilization of adjustable mounting brackets 160 and 170 (as illustrated). As shown in FIG. 2, openings 164 and 172 mounting bracket 160 is an and 170 are elongated slots. The tension of belt 210 may be adjusted when bolts 250 and 254 are loosened, by moving compressor pulley 202 away from or towards drive shaft pulley 110, pivoting the lower part of the compressor on bolt 252 and thereafter tightening bolts 250 and 254 when the desired tension is achieved. The tension of belt 210 is preferably adjusted to deliver adequate power to the compressor 200, but permits slippage when excessive power is being delivered by the drive shaft 72 which would damage the compressor 200, or the compressor pulley 202 ceases to rotate due to a malfunction in the compressor. A drive pulley belt tension of about 53 lb. per side allows the belt to slip at about 9 h.p., so that excessive power will not be drawn from the engine. As an additional safety measure, it is preferred that shear pins 60 and 120 be employed which shear when about 10 h.p. or more is being drawn from the engine by the compressor and drive system.

As shown in FIGS. 1 and 2, a belt guard 190 surrounds that portion of the belt 210 and compressor drive assembly shaft pulley 110 which is on a side opposite the compressor pulley 202. The belt guard 190 is connected to mounting attachment 102 on the outer surface of compressor drive assembly housing 90 through flanges 192 and 194 attached by means of nuts 243 and 247 with corresponding bolts and washers (not shown).

In order to minimize stress on the power take-off pad 22 and support structure to which it is attached, it is preferred that the compressor and drive system have a combined static overhung moment at the engine pad 20, of preferably about 113 in. lb.

The air conditioning refrigerant compressor 200 is connected to typical refrigerant evaporator and condensor units, with air duct systems, fans, and controls as is well known in the art. In particularly preferred embodiments, the refrigerant compressor 200 is connected to a pair of refrigerant condensor units, the condensors being individually attached to separate rear engine compartment doors of a helicopter and each door having upper and lower vents with a fan unit to draw air from outside the helicopter and over the corresponding condensors before returning the air outside the helicopter. The compressor and condensor units are further connected with preferably two refrigerant evaporator units, one located under the pilot's seat and the other located under the co-pilot's seat. Alternatively, the evaporators may be located behind the instrument panel. Such location of the condensors and evaporators does not adversely affect the balance of the helicopter.

The helicopter air conditioning compressor driving and mounting apparatus of the present invention does not adversely affect the support structure of the helicopter, and provides for rotational frequencies which do not introduce adverse vibrational characteristics. The belt drive system does not drain excessive power from the engine, and the shear pin system along with the provision for belt slippage provides for safe disconnection of the apparatus from the engine power output shaft in the event of malfunction.

It will be recognized by those skilled in the art that modifications may be made to the illustrated and described apparatus which will be within the scope of the invention. It is to be understood that the invention is not to be limited by the illustrations and description, but only by the scope of the claims.

What is claimed is:

1. An air conditioner refrigerant compressor driving and mounting apparatus for a helicopter of the type having an engine power output shaft and take-off pad comprising:
   (a) a compressor drive assembly housing supported by said take-off pad;
   (b) a compressor drive assembly drive shaft extending linearly through said compressor drive assembly housing from said engine power output shaft;
   (c) connecting means for connecting said compressor drive assembly drive shaft with said engine power output shaft to rotate said compressor drive assembly drive shaft;
   (d) bearing means providing for free rotation of said compressor drive assembly drive shaft within said compressor drive assembly housing;
   (e) a compressor drive assembly drive shaft pulley attached to said compressor drive assembly drive shaft;
   (f) bracket means for mounting an air conditioner refrigerant compressor on an outer surface of said compressor drive assembly housing such that a compressor drive shaft for driving said compressor is generally parallel with said compressor drive assembly drive shaft;
   (g) a compressor pulley attached to said compressor drive shaft and generally aligned with said compressor drive assembly drive shaft pulley; and
   (h) belt drive means connecting said compressor drive assembly drive shaft pulley with said compressor pulley to drive said compressor.

2. The apparatus of claim 1 wherein additionally disconnecting means are provided for disconnecting said rotating engine power output shaft from said compressor drive assembly drive shaft in the event of mechanical failure of said apparatus.

3. The apparatus of claim 2 wherein said disconnecting means comprises a collar and shear pin connecting said compressor drive assembly drive shaft with said connecting means.

4. The apparatus of claim 3 wherein said shear pin shears when about 10 h.p. or more is drawn from said engine power output shaft by said apparatus.

5. The apparatus of claim 1 wherein additionally disengaging means are provided for disconnecting said compressor drive assembly drive shaft pulley from said compressor drive assembly drive shaft in the event of mechanical failure of said apparatus.

6. The apparatus of claim 4 wherein said disengaging means comprises a collar and shear pin connecting said compressor drive assembly drive shaft pulley with said compressor drive assembly drive shaft.

7. The apparatus of claim 6 wherein said shear pin shears when about 10 h.p. or more is drawn from said engine power output shaft by said apparatus.

8. The apparatus of claim 1 wherein additionally adjustment means are provided for adjusting the tension of said belt drive means.

9. The apparatus of claim 1 wherein additionally said brackets are selectively adjustable brackets providing for selective movement of said compressor drive shaft towards or away from said compressor drive assembly drive shaft thereby adjusting the tension of said belt drive means.

10. The apparatus of claim 9 wherein said tension of said belt drive means is adjusted such that said belt drive means slips on said pulleys when said compressor draws about 9 h.p. or more.

11. The apparatus of claim 1 wherein said belt drive means, said compressor drive assembly drive shaft pulley and said compressor drive shaft pulley drive said compressor at a rotational frequency different from the rotational frequencies of said helicopter engine and a helicopter rotor.

12. The apparatus of claim 1 wherein said apparatus and said compressor have a combined static overhung moment of about 113 in. lb. at said engine pad.

* * * * *